US008996826B2

(12) United States Patent
Stringham

(10) Patent No.: US 8,996,826 B2
(45) Date of Patent: Mar. 31, 2015

(54) TECHNIQUES FOR SYSTEM RECOVERY USING CHANGE TRACKING

(75) Inventor: Russell Stringham, Orem, UT (US)

(73) Assignee: Symantec Corporation, Mountian View, CA (US)

( * ) Notice: Subject to any disclaimer, the term of this patent is extended or adjusted under 35 U.S.C. 154(b) by 792 days.

(21) Appl. No.: 12/431,497

(22) Filed: Apr. 28, 2009

(65) Prior Publication Data

US 2010/0274980 A1 Oct. 28, 2010

(51) Int. Cl.
*G06F 12/00* (2006.01)
*G06F 13/00* (2006.01)
*G06F 13/28* (2006.01)
*G06F 11/14* (2006.01)

(52) U.S. Cl.
CPC ........ *G06F 11/1441* (2013.01); *G06F 11/1451* (2013.01); *G06F 11/1469* (2013.01)
USPC ........................................................ 711/156

(58) Field of Classification Search
CPC .......................... G06F 11/1441; G06F 11/1451
USPC ........................................................ 711/156
See application file for complete search history.

(56) References Cited

U.S. PATENT DOCUMENTS

| | | | | |
|---|---|---|---|---|
| 5,649,152 | A * | 7/1997 | Ohran et al. | 711/114 |
| 5,835,953 | A * | 11/1998 | Ohran | 711/162 |
| 6,981,114 | B1 * | 12/2005 | Wu et al. | 711/162 |
| 7,051,173 | B2 | 5/2006 | Tsuchiya et al. | |
| 7,100,089 | B1 | 8/2006 | Phelps et al. | |
| 7,395,378 | B1 | 7/2008 | Pendharkar et al. | |
| 2001/0000821 | A1 * | 5/2001 | Kolodner et al. | 711/170 |
| 2002/0065985 | A1 * | 5/2002 | Garnett et al. | 711/117 |
| 2002/0112134 | A1 * | 8/2002 | Ohran et al. | 711/162 |
| 2004/0210608 | A1 * | 10/2004 | Lee et al. | 707/204 |
| 2004/0268068 | A1 | 12/2004 | Curran et al. | |
| 2006/0129610 | A1 | 6/2006 | Agarwal et al. | |
| 2008/0071842 | A1 | 3/2008 | Tokuda et al. | |
| 2008/0098157 | A1 * | 4/2008 | Andrewartha et al. | 711/103 |
| 2008/0117685 | A1 * | 5/2008 | Syzdek et al. | 365/185.21 |
| 2008/0162600 | A1 | 7/2008 | Mittal et al. | |
| 2010/0287351 | A1 * | 11/2010 | Kren et al. | 711/165 |

FOREIGN PATENT DOCUMENTS

WO WO-9820419 A1 5/1998

OTHER PUBLICATIONS

International Search Report and Written Opinion for International Application No. PCT/US2010/031979, mailed Nov. 5, 2010.
Unknown Author, Datasheet: Acronis True Image Echo Family Feature Guide, 14 pages, Jan. 2009.
Office Action mailed on Dec. 17, 2013 for co-pending CN Application No. 201080029047.0; 37 pages (with English translation).
Supplementary European Search Report mailed on Apr. 28, 2014 for co-pending EP Application No. 10772460.1; 6 pages.

* cited by examiner

*Primary Examiner* — Sheng-Jen Tsai
(74) *Attorney, Agent, or Firm* — Wilmer Cutler Pickering Hale and Dorr LLP

(57) ABSTRACT

Techniques for system recovery using change tracking are disclosed. In one particular exemplary embodiment, the techniques may be realized as a computer implemented method for providing system recovery using change tracking comprising receiving a request to write to electronic storage, identifying a region in the electronic storage region associated with the write request, setting a region indicator identifying the electronic storage region as dirty, and setting one or more portion indicators identifying one or more dirty portions of the electronic storage region.

19 Claims, 6 Drawing Sheets

TECHNIQUES FOR SYSTEM RECOVERY USING CHANGE TRACKING

FIELD OF THE DISCLOSURE

The present disclosure relates generally to system recovery and, more particularly, to techniques for system recovery using change tracking.

BACKGROUND OF THE DISCLOSURE

A backup system may track modifications or write requests to data since a prior backup so that the system may backup modified data. For example, a backup system may make periodic incremental backups of modified data. Backing up only modified data may use less storage space than a full backup of all data and may require less network traffic and disk Input/Output (I/O) processing.

Data modifications may be tracked to determine what to backup. Modified data which has been modified in memory but not yet written to disk is typically referred to as "dirty" data. Once modified data is written to disk it is typically referred to as "clean" data.

Tracked data modifications or write requests may either be stored in memory or written to disk. If tracked data modifications are written to disk, they may require a write request for every write request to disk. This overhead and additional I/o may be unacceptable for performance. If tracked data modifications are stored in memory, they may be written to disk at system shutdown to avoid loss of the tracked data modifications. If a system crashes, shuts down improperly, or experiences interruptions, the tracked data modifications may be lost. A user may then be faced with two difficult options. They may perform a full backup of all data to capture all possible changes, which may require more storage and take longer than an incremental backup. Alternatively, they may perform a reconciliation operation, which may identify the modifications to data since the last backup (i.e., the lost tracked modifications). The reconciliation operation may identify modifications by comparing portions of used storage, such as used blocks of disk, to portions of the last backup. After completion of the reconciliation operation, an incremental backup may be performed. However, the reconciliation operation may take as long or longer and may require as much or more I/O processing than a full backup.

In view of the foregoing, it may be understood that there may be significant problems and shortcomings associated with current system recovery technologies.

SUMMARY OF THE DISCLOSURE

Techniques for system recovery using change tracking are disclosed. In one particular exemplary embodiment, the techniques may be realized as a computer implemented method for providing system recovery using change tracking comprising receiving a request to write to electronic storage, identifying a region in the electronic storage region associated with the write request, setting a region indicator identifying the electronic storage region as dirty, and setting one or more portion indicators identifying one or more dirty portions of the electronic storage region.

In accordance with other aspects of this particular exemplary embodiment, system recovery using change tracking may further comprise determining whether to set the region indicator identifying the electronic storage region, and setting the region indicator in the event it is determined that the region indicator is to be set.

In accordance with further aspects of this particular exemplary embodiment, determining whether to set the region indicator identifying the electronic storage region may be based at least in part on a determination that the region indicator is currently set.

In accordance with additional aspects of this particular exemplary embodiment, system recovery using change tracking may further comprise determining whether to set the one or more portion indicators identifying the one or more dirty portions, and setting the one or more portion indicators in the event it is determined that the one or more portion indicators are to be set.

In accordance with additional aspects of this particular exemplary embodiment, determining whether to set the one or more portion indicators identifying the one or more dirty portions may be based at least in part on at least one of: a determination that the one or more portion indicators are currently set, a determination that every portion indicator of the electronic storage region is currently set, a determination to capture allocated portions of the electronic storage regions and a determination to restore allocated portions of the electronic storage region.

In accordance with additional aspects of this particular exemplary embodiment, setting a region indicator may comprise setting an indicator in volatile electronic storage and setting an indicator in non-volatile electronic storage.

In accordance with additional aspects of this particular exemplary embodiment, setting one or more portion indicators may comprise setting an indicator in volatile electronic storage and setting an indicator in non-volatile electronic storage.

In accordance with additional aspects of this particular exemplary embodiment, identifying a time for setting the one or more portion indicators in non-volatile electronic storage may be based on at least one of: determining that no additional portion indicators have been set for a specified period of time; determining that all portion indicators for the electronic storage region have been set; and a lower level of disk activity associated with the region at the identified time.

In accordance with additional aspects of this particular exemplary embodiment, system recovery using change tracking may further comprise unsetting a region indicator after the one or more portion indicators have been set in non-volatile electronic storage.

In accordance with additional aspects of this particular exemplary embodiment, the one or more portion indicators may comprise at least one of: a bitmap, a run list, a range, and a data structure identifying one or more portions of dirty data.

In accordance with additional aspects of this particular exemplary embodiment, system recovery using change tracking may further comprise utilizing a plurality of levels of region indicators, wherein the plurality of levels of region indicators enable further subdivision of change tracking of the electronic storage.

In accordance with additional aspects of this particular exemplary embodiment, the dirty portions may comprise at least one of: blocks, sectors, and clusters.

In accordance with additional aspects of this particular exemplary embodiment, the dirty regions may comprise segments.

In accordance with additional aspects of this particular exemplary embodiment, system recovery using change tracking may further comprise creating an image of the electronic storage, comparing the image of the electronic storage with a backup of the electronic storage using the region indicator to identify a dirty region of the electronic storage, and updating the one or more portion indicators of the identified dirty region based on a determination that one or more portions of electronic storage corresponding to the portion indicators were modified subsequent to the backup.

In accordance with additional aspects of this particular exemplary embodiment, system recovery using change tracking may further comprise creating an incremental backup using the region indicator to identify a dirty region of electronic storage, wherein the incremental backup captures allocated portions of the region indicated as dirty and the incremental backup captures only modified portions of data in a clean region.

In accordance with additional aspects of this particular exemplary embodiment, system recovery using change tracking may further comprise restoring one or more portions of data from backup using the region indicator to identify a dirty region of the electronic storage, wherein restoration of allocated portions of an identified dirty region is performed, and wherein restoration of one or more modified portions of a clean region is performed.

In accordance with additional aspects of this particular exemplary embodiment, the techniques may be realized as at least one processor readable medium for storing a computer program of instructions configured to be readable by at least one processor for instructing the at least one processor to execute a computer process for performing the method as recited in claim 1.

In another particular exemplary embodiment, the techniques may be realized as an article of manufacture for providing system recovery using change tracking, the article of manufacture comprising at least one processor readable medium, and instructions carried on the at least one medium, wherein the instructions are configured to be readable from the at least one medium by at least one processor and thereby cause the at least one processor to operate so as to receive a request to write to electronic storage, identify a region in the electronic storage associated with the write request, set a region indicator identifying the electronic storage region as dirty, and set one or more portion indicators identifying one or more dirty portions of the electronic storage region.

In yet another particular exemplary embodiment, the techniques may be realized as a system providing system recovery using change tracking comprising one or more processors communicatively coupled to a network, wherein the one or more processors are configured to receive a request to write to electronic storage, identify a region in the electronic storage associated with the write request, set a region indicator identifying the electronic storage region as dirty, and set one or more portion indicators identifying one or more dirty portions of the electronic storage region.

In accordance with other aspects of this particular exemplary embodiment, the one or more processors may further be configured to perform, using the region indicator, at least one of: a system reconciliation, a system backup, and a system restoration.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
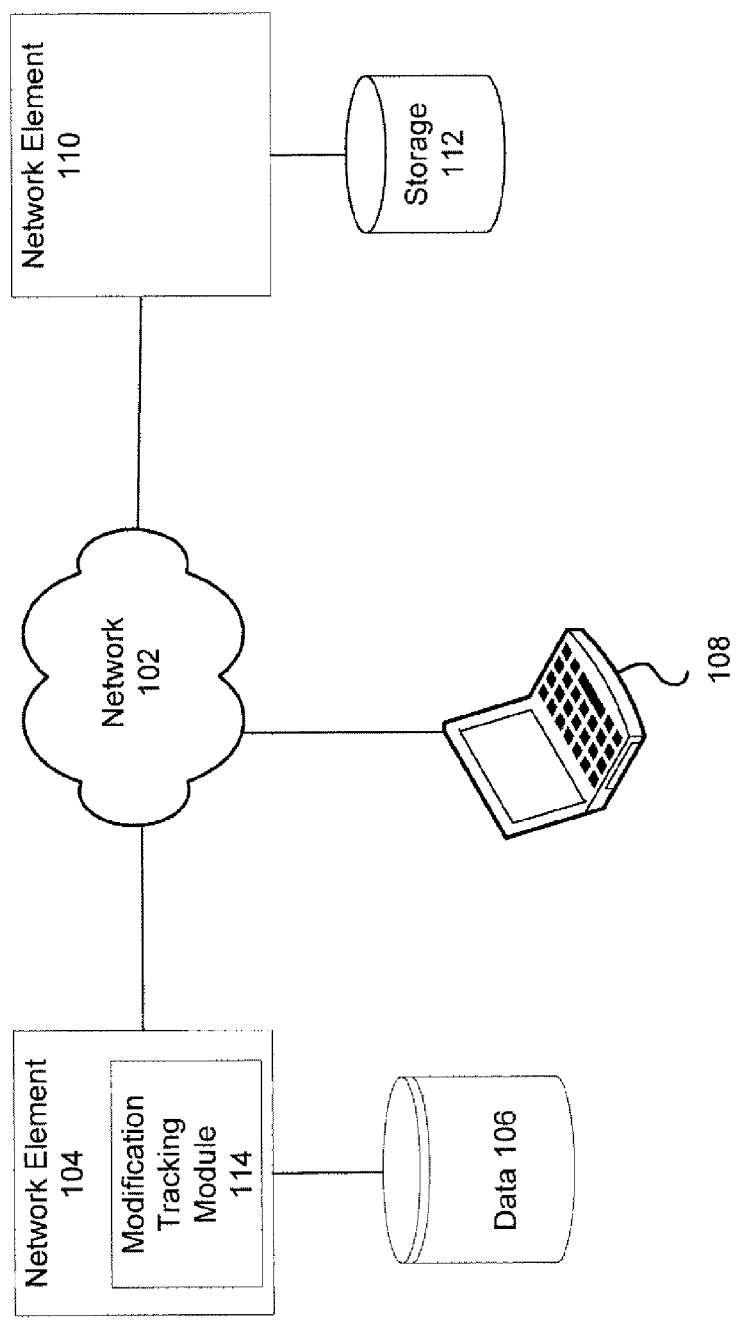
FIG. 1 shows a system for providing system recovery in accordance with an embodiment of the present disclosure.

Referring to FIG. 1, there is shown a system 100 for providing system recovery in accordance with an embodiment of the present disclosure. FIG. 1 is a simplified view of system 100, which may include additional elements that are not depicted. Network elements 104 and 110 may be communicatively coupled to network 102. Network element 104 may contain modification tracking module 114. Computer 108 may be communicatively coupled to network 102. Data 106 may be communicatively coupled to network element 104. Storage 112 may be communicatively coupled to network element 110.

Network 102 may be a local area network (LAN), a wide area network (WAN), the Internet, a cellular network, a satellite network, or another network that permits communication between network elements 104 and 110, computer 108 and other devices communicatively coupled to network 102.

Network elements 104 and 110 may be application servers, backup servers, network storage devices, media servers, or other devices communicatively coupled to network 102. Network elements 104 and 110 may utilize storage 112 for the storage of application data, backup data, or other data.

Network elements 104 and 110 may be hosts, such as an application server, which may process data traveling between itself and a backup device, a backup process, and/or storage.

Network element 110 may be a backup server attached to storage 112. In one or more embodiments, network element 110 may be capable of processing data received from or transmitted to storage 112. In other embodiments, network element 110 may represent a network appliance connected to a storage area network.

Computer 108 may be a desktop computer, a laptop computer, a server, or other computer. Computer 108 may receive data from user input, a database, a file, a web service, and/or an application programming interface. Computer 108 may query other systems and/or local or remote storage, such as data 110, network elements 104 and 110, and storage 112. Computer 108 may provide a user interface to a backup system, a data recovery system, or another data management system.

Data 106 may be network accessible storage and may be local, remote, or a combination thereof to network elements 104 and 110. Data 106 may utilize a tape, disk, a storage area network (SAN), or other computer accessible storage. In one or more embodiments, data 106 may represent a database or another application instance.

In one or more embodiments, data in storage 112 may be images, such as snapshots or other file system block level backups. Network element 110 may be a backup server which may handle requests for backup data.

Network element 104 may contain modification tracking module 114. Modification tracking module 114 may track write requests to data 106. In one or more embodiments, modification tracking module 114 may be a change tracking driver. Modification tracking module 114 may track write requests in memory or may send write requests to a backup server or another network element, such as network element 110. The modifications tracked by modification tracking module 114 may be stored in memory and/or on non-volatile storage such as disk.

According to one or more embodiments, modification tracking module 114 may utilize a plurality of levels of change tracking. For example, modification tracking module 114 may contain logic or data logically subdividing storage, such as data 106, into regions. There may be a plurality of regions for a unit of storage, such as a volume. The number of regions may depend on the size of the volume or other factors. In some embodiments, it may be configurable. A region may be a logical division of storage such as a segment. A region may be composed of a plurality of portions of data storage such as blocks, sectors, and/or clusters. The size of a portion of data storage, such as a block, may depend upon the operating system or other factors. In some embodiments, it may be configurable. Modification tracking module 114 may track changes at a region level and at a finer level of granularity such as a block.

Modification tracking module 114 may create a plurality of data structures to track changes such as bitmaps, run lists (e.g., a data structure which may provide an address of a first portion of used storage and a length or number of units of used storage), arrays, pointers, ranges, and other data structures for efficiently identifying used portions of electronic storage. Modification tracking module 114 may use a first data structure to identify regions of electronic storage which have been modified, which may be referred to as a "dirty region map." A dirty region map may contain one bit or other indicators for each region on the unit of storage being tracked by modification tracking module 114, such as a volume. A dirty region map may be maintained in volatile and non-volatile storage.

For each region, modification tracking module 114 may maintain a data structure containing a bit or other indicator for each portion of data storage of the region, such as a block. This may be referred to as a "block map".

When a write request is detected by modification tracking module 114, modification tracking module 114 may identify the region corresponding to the write request and may set the appropriate bit or other indicator in the dirty region map which corresponds to the region. Modification tracking module 114 may also set appropriate bits or indicators in one or more block maps in memory which may identify the modified portions of each dirty region.

As mentioned above, the dirty region map may be maintained in volatile and non-volatile storage. For example, an appropriate bit may be set in the dirty region map in memory and on disk, prior to a write. Appropriate bits may also be set in memory for one or more block maps. Thus, if a system crash, improper shutdown, or other interruption occurs, the dirty region map indicating one or more modified regions may be preserved in non-volatile memory.

However, according to some embodiments, the block maps may not be written to non-volatile storage during the processing of the tracked write request. For example, the write request may be written to disk, but the tracking of the modified blocks for system recovery may be written to memory (e.g., to one or more block maps). Once the write request has completed, the tracking of the modified blocks may be written to disk. Write requests may typically occur in groups, thus many write requests may occur sequentially to the same region. For each subsequent write request to the region, modification tracking module 114 may verify that the appropriate bit is set in the dirty region map in memory and the write requests may be processed without requiring an additional write to track the modifications. Once the write requests to a region have stopped or paused, for one or more regions flagged or indicated in the dirty region map, modification tracking module 114 may write to block maps on non-volatile storage (e.g., flush the block maps to disk) indicating which blocks have been modified. Once a block map for a region has been written to non-volatile storage, the dirty region map may be updated to unset or clear the indicator for the region (i.e., mark the region as clean).

Modification tracking module 114 may use additional flags or indicators. For example, two extra indicators may be provided for each region. A first indicator may be set if a region has not been dirty previously (e.g., no changes have occurred to the blocks of a region since the last backup). This may enable modification tracking module 114 to write block maps for that region directly to disk from memory without first checking to see if block maps exist on disk that may require updating. A second indicator may be set if every block in a region has been modified. If every block in a region has been modified modification tracking module 114 may stop tracking changes to blocks in the region (i.e., a subsequent operation such as a backup operation may understand that all blocks are to be captured.)

In the event of a system crash or disruption, a backup component or process, such as a backup process running on network element 110, may perform a reconciliation operation using the dirty region map, as described in further detail below in reference to FIG. 4. This may enable modification change tracking to continue. A backup process or component may perform other operations in addition to or as an alternative to the reconciliation operation. For example, a backup process or component may also perform an incremental backup using the dirty region map and one or more block maps, as described in further detail in reference to FIG. 5 below. A backup process or component may further perform a restoration operation using the dirty region map and one or more block maps, as described in reference to FIG. 5 below.

Figure 2:
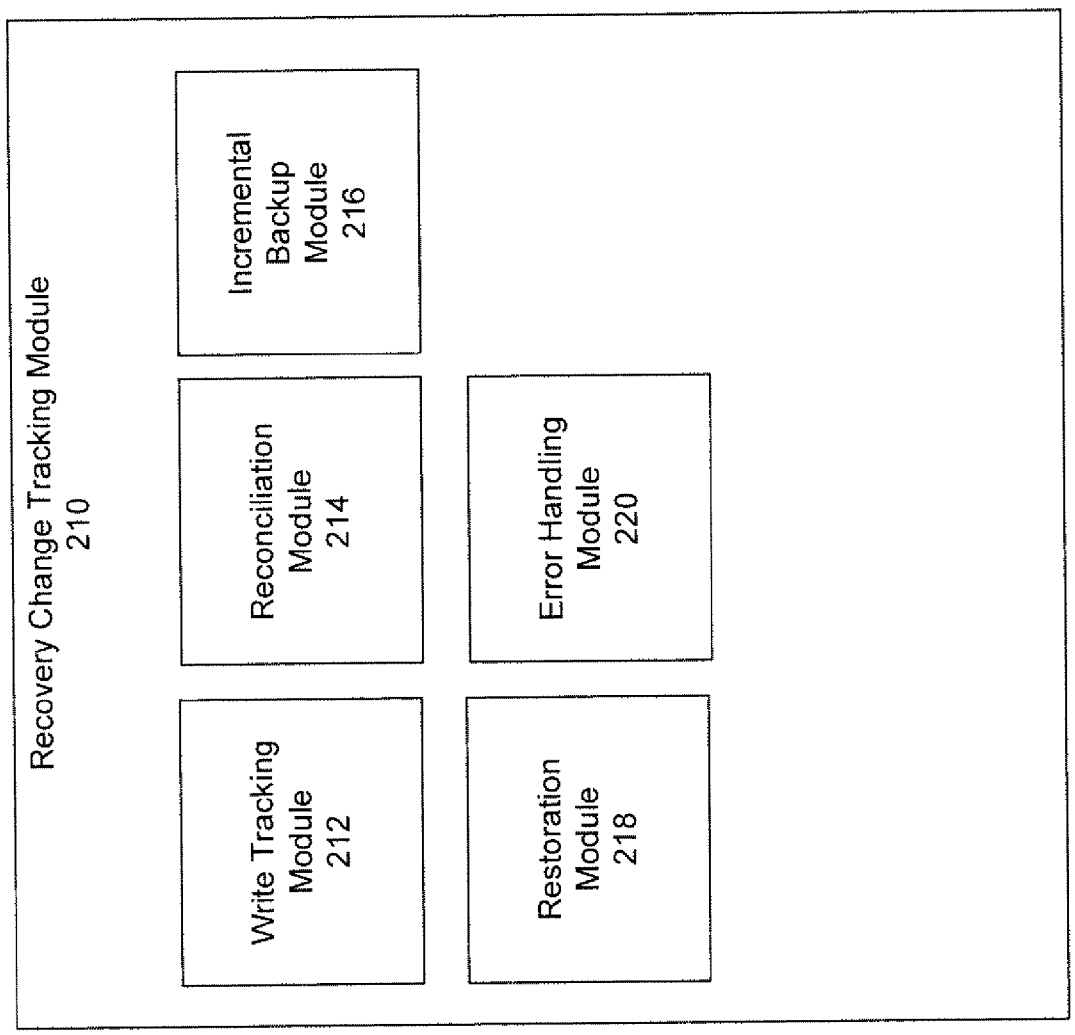
FIG. 2 shows a module for providing system recovery in accordance with an embodiment of the present disclosure.

Referring to FIG. 2, there is shown a recovery change tracking module 210 for providing system recovery in accordance with an embodiment of the present disclosure. As illustrated, the recovery change tracking module 210 may contain one or more components including write tracking module 212, reconciliation module 214, incremental backup module 216, restoration module 218, and error handling module 220.

Write tracking module 212 may detect an interrupt or a request to write to non-volatile storage, such as disk. Write tracking module 212 may determine a region associated with the write request and may set a bit, a flag, or other indicator signifying that the region is dirty (i.e., the region has been written to, but the block modification changes tracked for system recovery have not been saved to the block maps in non-volatile storage). The indicator, bit, or flag may be set in memory and written to disk.

Write tracking module 212 may track changes to portions of a region such as blocks. These modifications may be tracked by setting a flag, an indicator, or a bit in one or more block maps in memory. Once write requests to a region have subsided, write tracking module 212 may write one or more block maps to non-volatile storage (e.g., flush block maps to disk). The determination of when to write a block map to non-volatile storage may be based on various algorithms. According to some embodiments, the level of writes to a region may be monitored and one or more block maps may be written to non-volatile storage a specified period of time after the level of writes to a region has dropped below a specified threshold. For example, the block map may be written to non-volatile storage thirty seconds after write requests to a region have stopped.

Once one or more of the block maps for a region have been written to non-volatile storage, write tracking module 212, may mark the region as clean. Write tracking module 212 may mark a region as clean by unsetting or setting an indicator, flag, or bit corresponding to the appropriate region in the dirty region map. The dirty region map may contain a plurality of region indicators. According to some embodiments, write tracking module 212 may manage a plurality of levels of dirty region maps. For example, a top level map may contain indicators corresponding to a sub-level of dirty region maps. Each of these dirty region maps may comprise a plurality of block maps. The number of block maps to a region, the number of layers or levels of regions, the size of the block maps, and the size of the dirty region maps may be determined by a number of factors, including storage size, available memory, user preferences, and calculated processing times of backup system operations.

Reconciliation module 214 may enable the reconciliation of modification tracking after a system crash, an improper system shutdown, an outage, or other system interruption. Such reconciliation may enable modifications in dirty regions to be identified and written to one or more block maps in non-volatile storage so that dirty regions may be set as clean (e.g., a corresponding indicator in a dirty region map may be reset). Reconciliation module 214 may create an image, such as a snapshot, of storage after a system crash or other outage. Reconciliation module 214 may then compare this image with a most recent backup using a dirty region map. Reconciliation module 214 may check one or more portions of the image, such as blocks, against corresponding portions of the most recent backup. Reconciliation module 214 may check only one or more portions of the image and/or backup within regions indicated as dirty by the dirty region map. One or more block maps which correspond to portions of the backup that are different from the image may be updated to indicate that the portions have been modified (e.g., the regions may already have been indicated as dirty, since the reconcile operation may be directed to reconcile regions marked as dirty). Once the modified portions of a dirty region have been indicated appropriately in corresponding block maps of the dirty region, the reconciliation process is complete for that region. When all dirty regions have been reconciled, reconciliation may be complete. Depending on user preference, system settings, or other factors, the reconciliation process may only perform updates in memory to block maps in dirty regions. Writes to a non-volatile copy of the block maps may be performed later depending on the level of write activity to the non-volatile storage region (e.g., a sector of a disk).

In one or more embodiments, when reconciliation module 214 creates an image a second set of change tracking maps may be created. The reconciliation process may continue using the prior set of change tracking maps (i.e., one or more dirty regions maps and one or more block maps) Modification tracking may continue and may use the second set of change tracking maps. After reconciliation is complete prior dirty region maps may not be required and may be discarded. Prior block maps may be combined with the new block maps at a later time, such as at backup.

Incremental backup module 216 may enable an incremental backup to be performed after a system crash, an outage, or other disruption. For one or more regions indicated as clean in a dirty region map (e.g., not flagged in the dirty region map), portions, such as blocks, which are marked as modified in one or more block maps of the one or more regions may be backed up. For one or more regions marked as dirty in a dirty region map, all used portions of storage in the one or more regions may be backed up. This may be significantly faster than a full backup and may use less space and require less overhead and I/O processing than if each modified portion, such as a block, had been flagged in non-volatile storage for each write.

Restoration module 218 may enable restoration of data after a system crash, outage, or other interruption. A user may desire to roll back the data or return the system to an earlier state (e.g., a software upgrade or installation may have been responsible for the crash and a restore may put back an earlier stable version.) Restoration module 218 may use a dirty region map and one or more block maps to identify changed data to be restored. In one or more regions indicated as clean in a dirty region map, restoration module 218 may restore only portions of data which were modified since a last backup, as indicated by one or more block maps. In one or more regions marked as dirty in a dirty region map, restoration module 218 may restore all portions or blocks of data, The number of dirty regions may typically be small and the number of changed portions in clean regions may be significantly less than in the entire region. Thus, restoration time and I/O processing may be significantly less than that of a full restoration.

Error handling module 220 may handle errors associated with modification tracking, reconciliation of modification tracking, backups, and restorations. Error handling module 220 may log errors, such as errors occurring during modification tracking, and other error related events.

Figure 3:
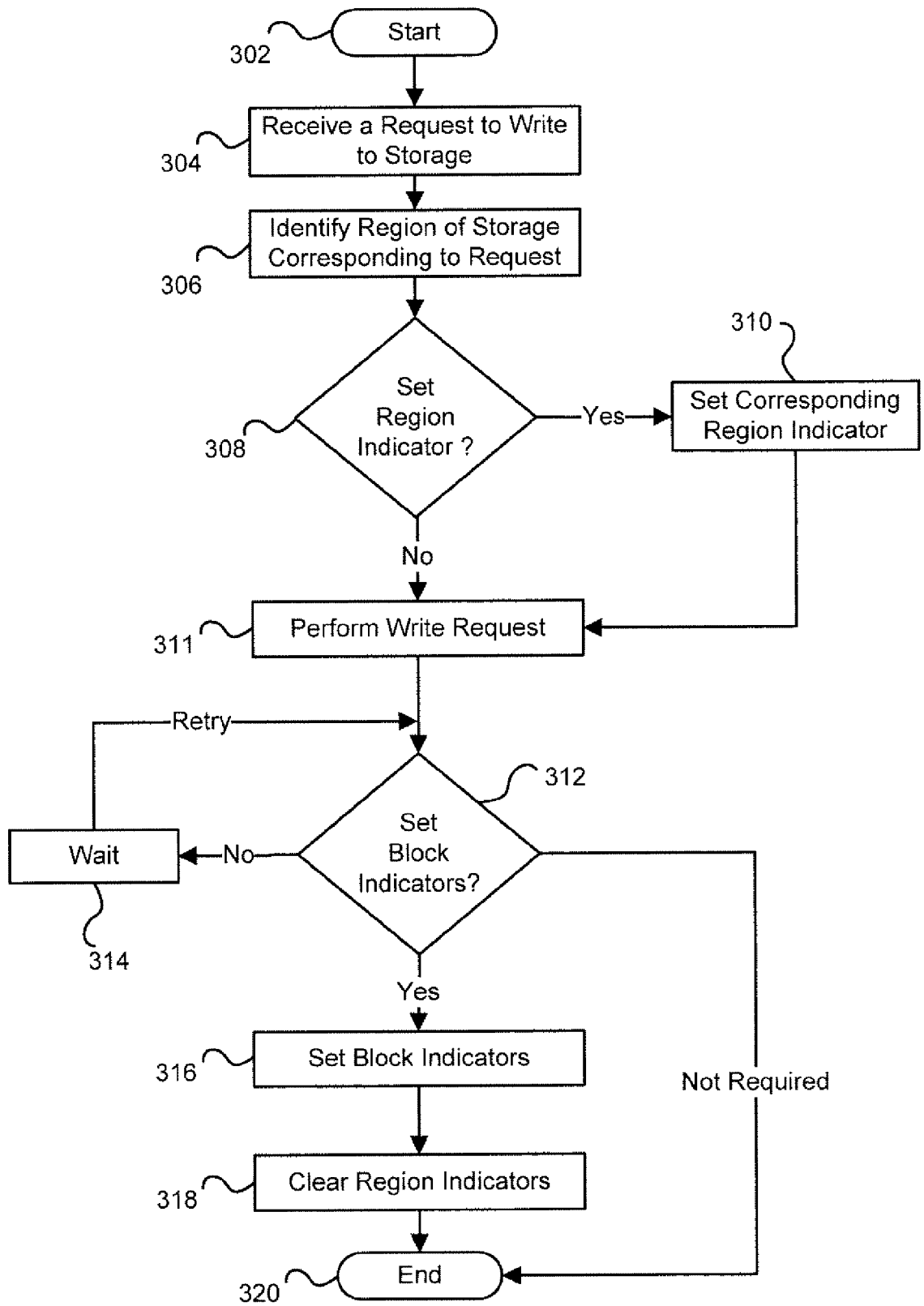
FIG. 3 depicts a method for providing system recovery in accordance with an embodiment of the present disclosure.

Referring to FIG. 3, there is depicted a method 300 for providing system recovery in accordance with an embodiment of the present disclosure. At block 302, the method 300 may begin.

At block 304, the method 300 may comprise receiving a request to write to storage. The request may be received by a device driver tracking write requests to storage such as disk, tape, or other storage media.

At block 306, the method 300 may comprise identifying a region associated with an area of storage targeted by the write request. The size and number of one or more regions for a storage area, such as a volume, may vary depending on the size of the storage area, the operating system, or other factors. Once a region corresponding to a write request has been identified, a corresponding indicator, flag, or bit corresponding to a dirty region map may be identified. In some embodiments, there may be a plurality of dirty region maps and an appropriate dirty region map may be identified (e.g., a top level dirty region map may contain indicators to a plurality of lower level dirty region maps, which may provide further subdivision of storage).

At block 308, the method 300 may comprise determining whether a dirty region indicator, bit, or flag requires setting. During a first write to a region since one or more block maps of the region were flushed to disk, the region may be indicated as clean on a dirty region map and may require setting an indicator to signify the region is dirty. If other writes in the region have occurred which have not been recorded in one or more block maps in non-volatile storage, the region may already be indicated as dirty in a dirty region map, Other factors may be considered when determining whether to set a region to dirty. For example, if every portion of a region has already been indicated as modified in corresponding block maps in non-volatile storage, it may not be necessary in some embodiments to mark a region as dirty. If a corresponding region indicator is to be set, the method 300 may continue at block 310. If a corresponding region indicator does not require setting, the method 300 may continue at block 312.

At block 310, the method 300 may comprise setting an appropriate flag, bit, or indicator corresponding to a region to be marked as dirty (i.e., the region for which the write request was received). The setting of the flag, bit, or other indicator may occur in memory, followed by writing the updated portion of the dirty region map to non-volatile storage, such as disk. After writing the dirty region map update to non-volatile storage, the method 300 may continue at block 311.

At block 311, the write request may be completed. The data identified in the write request may be written to non-volatile storage such as disk.

At block 312, the method 300 may comprise determining whether or not to write to non-volatile storage one or more block indicators corresponding to portions of storage modified in the write request. The block indicators may be set in a block map in memory. However, a determination may also be made whether to write block maps from memory to non-volatile storage, such as disk. The determination may be made based on a level of storage I/O processing occurring, such as the level of I/O processing associated with a corresponding region of a disk. In one or more embodiments, other factors may be considered. For example, a flag or indicator may be set when every portion of a region has been indicated as modified on non-volatile storage (e.g., all bits of block maps for the region have previously been set in non-volatile storage and the region has previously been marked as clean). If one or more block indicators for a region are not to be set because all block indicators for the region have been set or because of other factors, the method 300 may end at block 320. If one or more block indicators for a region are not to be set at the present time because of a level of storage I/O processing or other factors, the method 300 may continue at block 314. If one or more block indicators for a region are to be set, the method 300 may continue at block 316.

At block 314, the method 300 may comprise waiting. The wait period may be specified by a users specified by the system, determined by an algorithm, or received as an input. After the expiration of the wait period, the method 300 may return to block 312.

At block 316, the method 300 may comprise setting block indicators corresponding to modified blocks. One or more block maps may be written to non-volatile storage. This may involve reading a prior block map from non-volatile storage and updating it. In some embodiments, additional indicators may be used. For example, there may be an indicator set for a region if that region has not previously been dirty. If this indicator is set, updates to blocks in that region may not require reading in a block map from non-volatile storage prior to updating a block map, since the block maps in that region have not previously been set.

At block 318, the method 300 may comprise clearing one or more region indicators. Once all block maps for a region have been written to storage, a region indicator in a corresponding dirty region map may be cleared.

At block 320, the method 300 may end.

Figure 4:
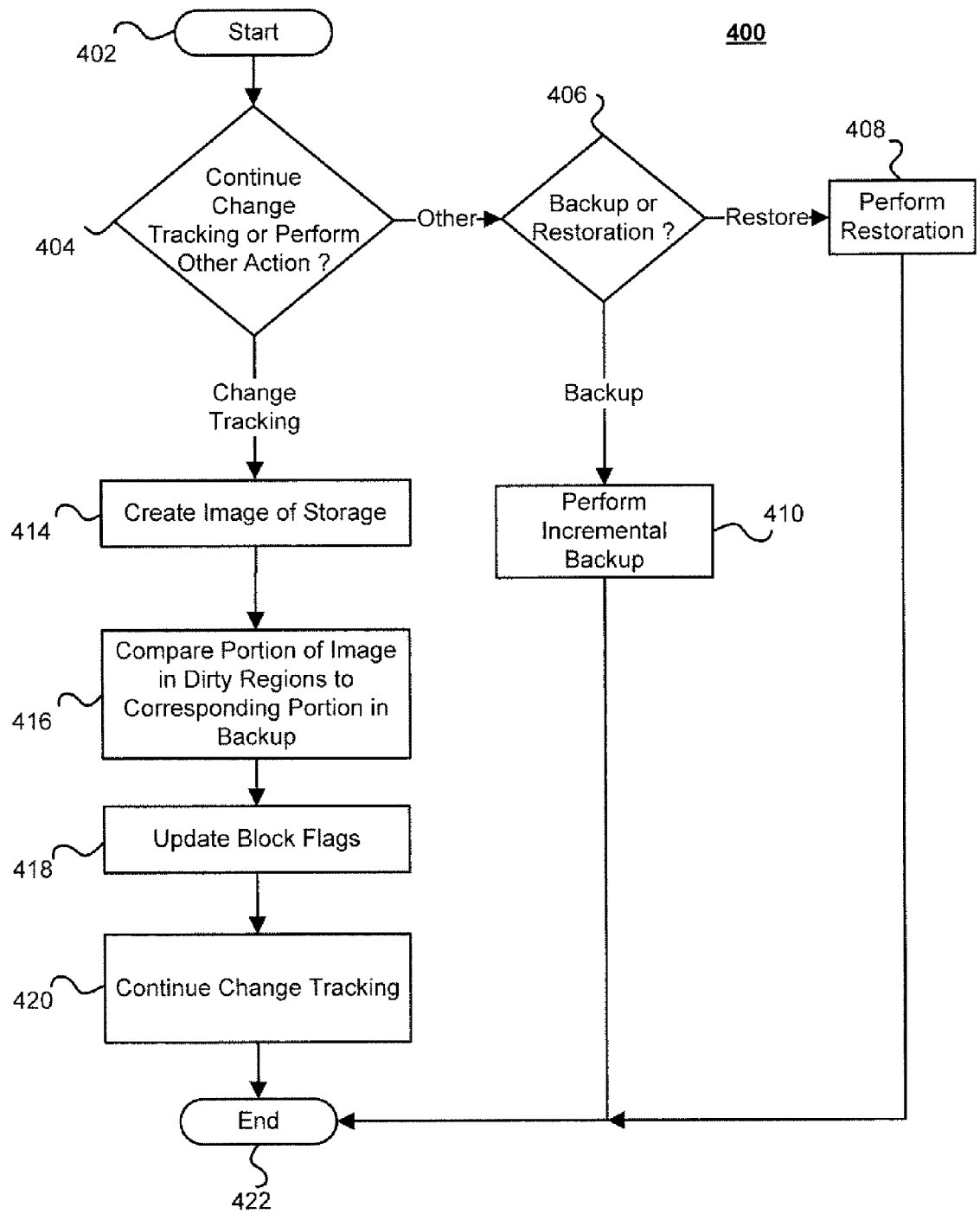
FIG. 4 depicts a method for providing system reconciliation in accordance with an embodiment of the present disclosure.

Referring to FIG. 4, there is depicted a method 400 for providing system reconciliation in accordance with an embodiment of the present disclosure. At block 402, the method 400 may begin.

At block 404, the method 400 may comprise determining or receiving input regarding whether to continue change tracking or perform another action, such as a backup or a restore. If change tracking is to be continued, the method 400 may continue at block 414. Otherwise, method 400 may continue at block 406.

At block 406, the method 400 may comprise determining or receiving input as to a further action to take. If a backup is to be taken, the method 400 may continue at block 410. If a restoration is to be performed, the method 400 may continue at block 408.

At block 408, the method 408 may comprise performing a restore operation. Performing a restore operation using change tracking is described in further detail in reference to FIG. 6 below.

At block 410, the method 400 may comprise performing a backup, such as an incremental backup. Performing an incremental backup using change tracking is described in further detail in reference to FIG. 5 below.

At block 414, the method 400 may comprise creating an image of storage, such as a snapshot. According to one or more embodiments, once an image has been created change tracking may resume.

At block 416, the method 400 may comprise comparing portions of the image, in regions indicated as dirty by a dirty region map, to corresponding portions in a backup. The comparison may identify one or more portions of a dirty region which may have been modified since the backup was created.

At block 418, the method 400 may comprise updating one or more flags, bits, or other indicators on one or more block maps. The updates may correspond to portions identified as modified in block 416.

At block 420, the method 400 may comprise continuing change tracking.

At block 422, the method 400 may end.

Figure 5:
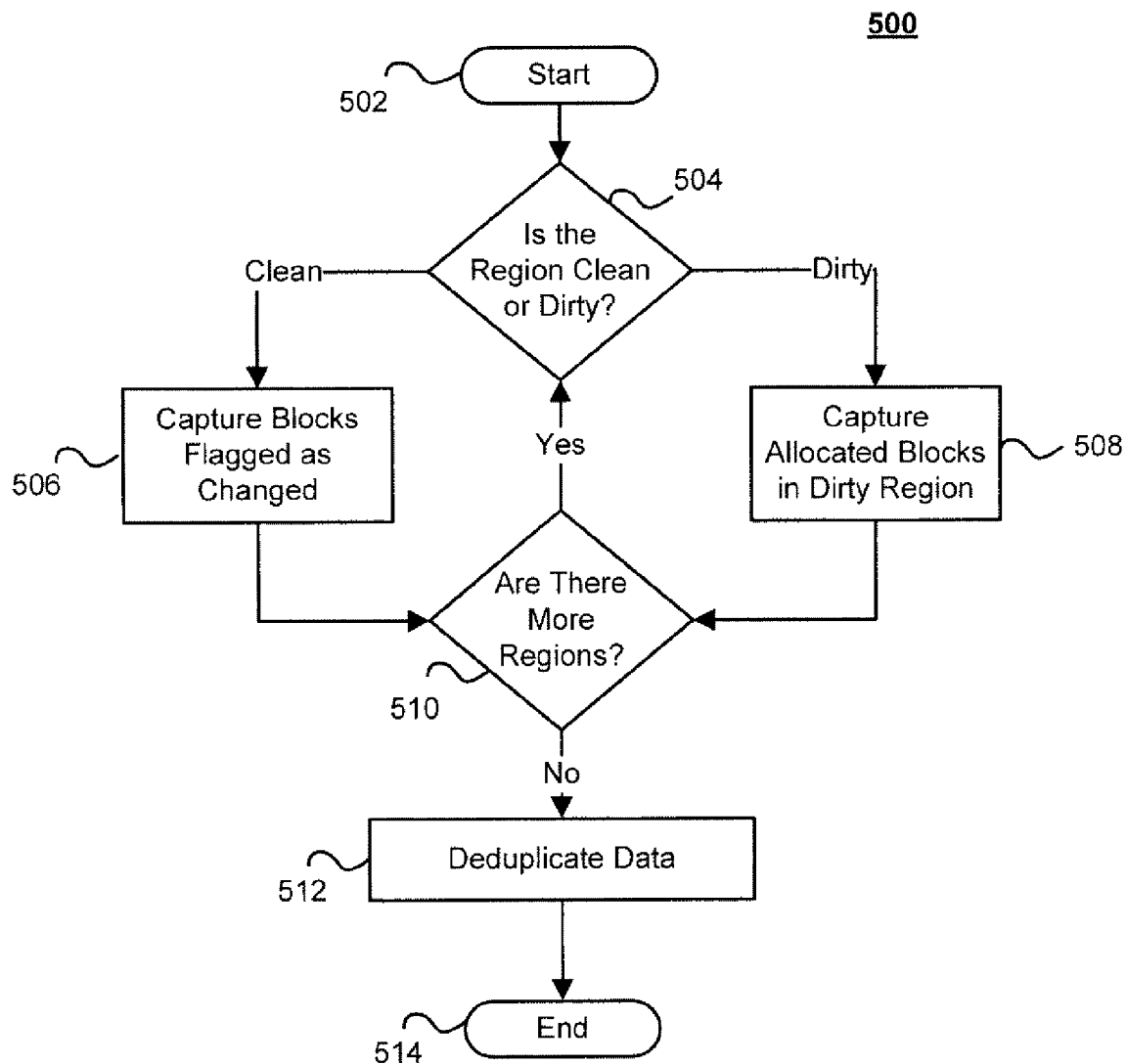
FIG. 5 depicts a method for providing an incremental backup in accordance with an embodiment of the present disclosure.

Referring to FIG. 5, there is depicted a method 500 for providing an incremental backup in accordance with an embodiment of the present disclosure. At block 502, the method 500 may begin.

At block 504, the method 500 may comprise determining whether a region is clean or dirty. The method 500 may comprise using one or more dirty region maps to identify a corresponding dirty region indicator on a map. If the corresponding indicator is set, the method 500 may continue at block 508. If the corresponding indicator is not set, the method 500 may continue at block 506.

At block 506, the method 500 may comprise capturing to backup blocks indicated as changed in a region indicated as clean. It may only capture a subset of the changed blocks, namely those allocated by the file system.

At block 50S, the method 500 may comprise capturing to backup blocks allocated by the file system in a region indicated as dirty.

At block 510, the method 500 may comprise determining whether there are more regions to be backed up. If there are more regions to be backed up, the method 500 may return to block 504. If there are no more regions to be backed up, the method may continue at block 512.

At block 512, the method 500 may comprise deduplicating backup data. Such deduplication may reduce and/or remove redundant data and may decrease storage and I/O processing required for the backup data. For example, if some blocks captured at block 508 have not changed since a prior backup, this step may identify them as having been previously backed up. This may prevent the blocks from being stored a second time (i.e., redundantly).

At block 514, the method 500 may end.

Figure 6:
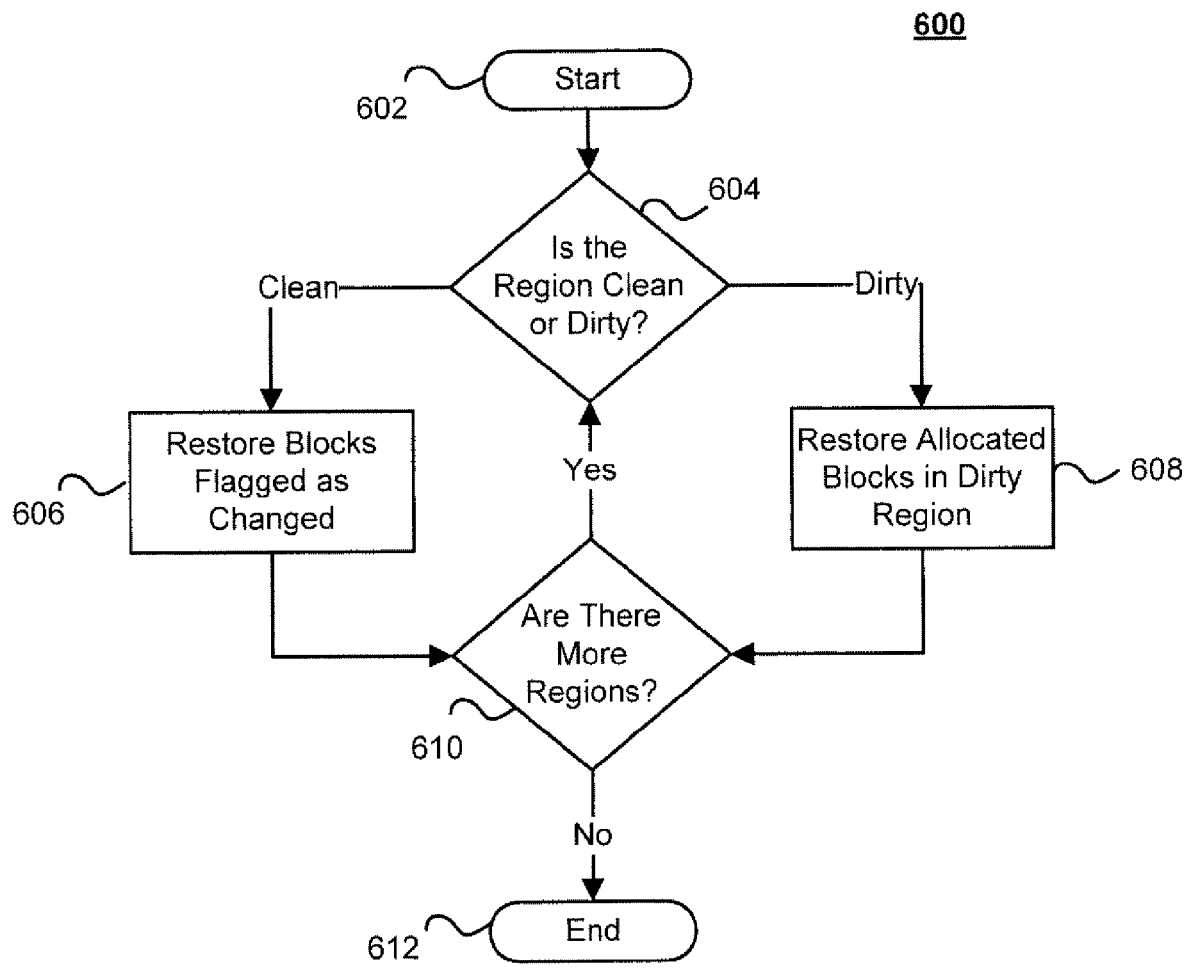
FIG. 6 depicts a method for providing system restoration in accordance with an embodiment of the present disclosure.

Referring to FIG. 6, there is depicted a method 600 for providing system restoration in accordance with an embodiment of the present disclosure. At block 602, the method 600 may begin.

At block 604, the method 600 may comprise determining whether a region is clean or dirty. The method 600 may comprise using one or more dirty region maps to identify a corresponding dirty region indicator on a map. If the corresponding indicator is set, the method 600 may continue at block 608. If the corresponding indicator is not set, the method 600 may continue at block 606.

At block 606, the method 600 may comprise restoring backup portions, such as blocks, indicated as changed in a region indicated as clean.

At block 608, the method 600 may comprise restoring all backup blocks in a region indicated as dirty.

At block 610, the method 600 may comprise determining whether additional regions are to be restored. If additional regions are to be restored, the method 600 may return to block 604. If no additional regions are to be restored, the method 600 may continue at block 612.

At block 612, the method 600 may end.

At this point it should be noted that providing a system recovery in accordance with the present disclosure as described above typically involves the processing of input data and the generation of output data to some extent. This input data processing and output data generation may be implemented in hardware or software. For example, specific electronic components may be employed in a module for system recovery or similar or related circuitry for implementing the functions associated with providing system recovery in accordance with the present disclosure as described above. Alternatively, one or more processors operating in accordance with instructions may implement the functions associated with providing system recovery in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for providing system recovery using change tracking comprising:
receiving a request to write to non-volatile electronic storage;
identifying an electronic storage region in the non-volatile electronic storage associated with the write request;
setting a region indicator in volatile electronic storage identifying the electronic storage region as dirty, wherein the region indicator is at one level of a plurality of levels of region indicators, wherein the plurality of levels of region indicators provide a subdivision of change tracking of the non-volatile electronic storage into multiple layers of regions of the non-volatile electronic storage;
setting a region indicator in the non-volatile electronic storage identifying the electronic storage region as dirty; and
setting one or more portion indicators identifying one or more dirty portions of the electronic storage region, wherein setting one or more portion indicators identifying one or more dirty portions of the electronic storage region comprises setting an indicator in the volatile electronic storage and determining, based on one or more factors, whether to set an indicator in the non-volatile electronic storage or whether to defer setting an indicator in non-volatile electronic storage.

2. The method of claim 1, wherein setting at least one of the region indicator in volatile electronic storage and the region indicator in non-volatile electronic storage further comprises:
determining whether to set at least one of the region indicator in volatile electronic storage identifying the electronic storage region and the region indicator in non-volatile electronic storage identifying the electronic storage region based on one or more factors.

3. The method of claim 2, wherein the factors include a determination of whether the region indicator had previously been set and a determination of whether every portion in the region has already been marked as dirty.

4. The method of claim 1, further comprising:
determining whether to set the one or more portion indicators identifying the one or more dirty portions; and
setting the one or more portion indicators in the event it is determined that the one or more portion indicators are to be set.

5. The method of claim 4, wherein the determination is based at least in part on at least one of:
a determination whether the one or more portion indicators had previously been set;
a determination whether every portion indicator of the electronic storage region had previously been set;
a determination to capture allocated portions of the electronic storage region; and
a determination to restore allocated portions of the electronic storage region.

6. The method of claim 1, wherein the one or more factors comprise:
a determination that no additional portion indicators have been set for a specified period of time;
a determination that all portion indicators for the electronic storage region have been set; and
a lower level of disk activity associated with the region at the identified time.

7. The method of claim 1, further comprising unsetting a region indicator after the one or more portion indicators have been set in the non-volatile electronic storage.

8. The method of claim 1, wherein the one or more portion indicators comprise at least one of: a bitmap, a run list, a range, and a data structure identifying one or more portions of dirty data.

9. The method of claim 1, wherein the dirty portions comprise at least one of:
blocks, sectors, and clusters.

10. The method of claim 1, wherein the dirty regions comprise segments.

11. The method of claim 1, further comprising:
creating an image of the electronic storage;
comparing the image of the electronic storage with a backup of the electronic storage using at least one of the region indicator in volatile electronic storage and the region indicator in non-volatile electronic storage to identify a dirty region of the electronic storage; and
updating the one or more portion indicators of the identified dirty region based on a determination that one or more portions of electronic storage corresponding to the portion indicators were modified subsequent to the backup.

12. The method of claim 1, further comprising:
creating an incremental backup using at least one of the region indicator in volatile electronic storage and the region indicator in non-volatile electronic storage to identify a dirty region of electronic storage, wherein the incremental backup captures allocated portions of the region indicated as dirty and the incremental backup captures only modified portions of data in a clean region.

13. The method of claim 1, further comprising:
restoring one or more portions of data from backup using at least one of the region indicator in volatile electronic storage and the region indicator in non-volatile electronic storage to identify a dirty region of the electronic storage, wherein restoration of allocated portions of an identified dirty region is performed, and wherein restoration of one or more modified portions of a clean region is performed.

14. At least one non-transitory processor readable storage medium for storing a computer program of instructions configured to be readable by at least one processor for instructing the at least one processor to execute a computer process for performing the method as recited in claim 1.

15. An article of manufacture for providing system recovery using change tracking, the article of manufacture comprising:
at least one non-transitory processor readable storage medium; and
instructions carried on the at least one processor readable storage medium;
wherein the instructions are configured to be readable from the at least one processor readable storage medium by at least one processor and thereby cause the at least one processor to operate so as to:
receive a request to write to non-volatile electronic storage;
identify an electronic storage region in the non-volatile electronic storage associated with the write request;
set a region indicator in volatile electronic storage identifying the electronic storage region as dirty, wherein the region indicator is at one level of a plurality of levels of region indicators, wherein the plurality of levels of region indicators provide a subdivision of change tracking of the non-volatile electronic storage into multiple layers of regions of the non-volatile electronic storage;
set a region indicator in the non-volatile electronic storage identifying the electronic storage region as dirty; and
set one or more portion indicators identifying one or more dirty portions of the electronic storage region, wherein setting one or more portion indicators identifying one or more dirty portions of the electronic storage region comprises setting an indicator in the volatile electronic storage and determining, based on one or more factors, whether to set an indicator in the non-volatile electronic storage or whether to defer setting an indicator in non-volatile electronic storage.

16. A system providing system recovery using change tracking comprising:
one or more processors communicatively coupled to a network; wherein the one or more processors are configured to:
receive a request to write to non-volatile electronic storage;
identify an electronic storage region in the non-volatile electronic storage associated with the write request;
set a region indicator in volatile electronic storage identifying the electronic storage region as dirty, wherein the region indicator is at one level of a plurality of levels of region indicators, wherein the plurality of levels of region indicators provide a subdivision of change tracking of the non-volatile electronic storage into multiple layers of regions of the non-volatile electronic storage;
set a region indicator in the non-volatile electronic storage identifying the electronic storage region as dirty; and
set one or more portion indicators identifying one or more dirty portions of the electronic storage region, wherein setting one or more portion indicators identifying one or more dirty portions of the electronic storage region comprises setting an indicator in the volatile electronic storage and determining, based on one or more factors, whether to set an indicator in the non-volatile electronic storage or whether to defer setting an indicator in non-volatile electronic storage.

17. The system of claim 16, wherein the one or more processors are further configured to perform, using at least one of the region indicator in volatile electronic storage and the region indicator in non-volatile electronic storage, at least one of: a system reconciliation, a system backup, and a system restoration.

18. The method of claim 1, further comprising setting an additional indicator if the electronic storage region has not been dirty since a last backup.

19. The method of claim 9, further comprising setting an additional indicator if every block in the electronic storage region has been modified.

* * * * *